(No Model.)

J. TEAGLE.
APPARATUS FOR FREEZING PARAFFINE OILS.

No. 314,488. Patented Mar. 24, 1885.

WITNESSES:
Geo. B. Tibbitts
Ew. Laird.

INVENTOR
John Teagle
Geo. W. Tibbitts
ATTORNEY

UNITED STATES PATENT OFFICE.

JOHN TEAGLE, OF CLEVELAND, OHIO.

APPARATUS FOR FREEZING PARAFFINE-OILS.

SPECIFICATION forming part of Letters Patent No. 314,488, dated March 24, 1885.

Application filed November 13, 1884. (No model.)

*To all whom it may concern:*

Be it known that I, JOHN TEAGLE, of Cleveland, in the county of Cuyahoga and State of Ohio, have invented certain new and useful Improvements in Apparatus for Freezing Paraffine-Oils, of which the following is a specification.

This invention relates to apparatus for chilling or freezing paraffine-oils preparatory to separating the wax from the oil, and has for its object to cheapen, facilitate, and improve the paraffine-wax product obtained therefrom; and it consists of a rotating cylinder arranged to be partly submerged in a refrigerating element contained in a suitable tank in such a manner that said cylinder shall be kept at a low temperature. Upon the surface of said cylinder the paraffine-oil is deposited for freezing from a pipe in small streams or spray, and when frozen is scraped or removed in proper condition for the presses.

Figure 1:
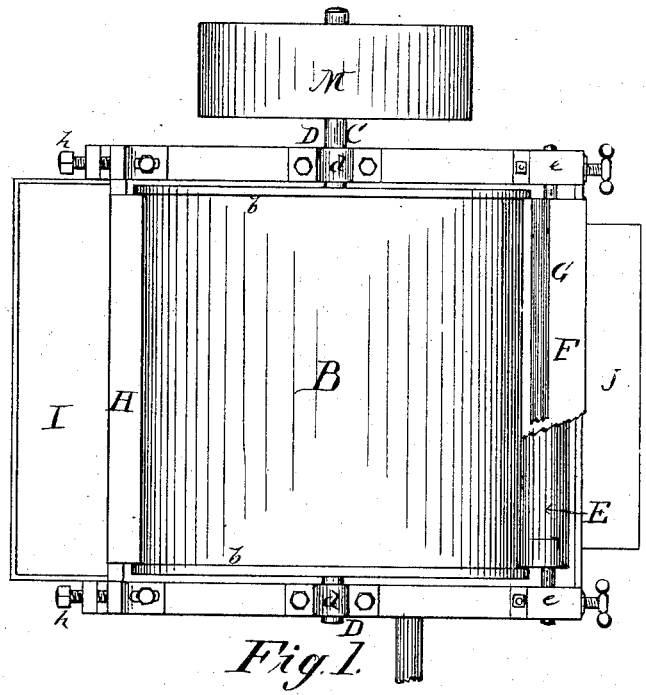
Figure 2:
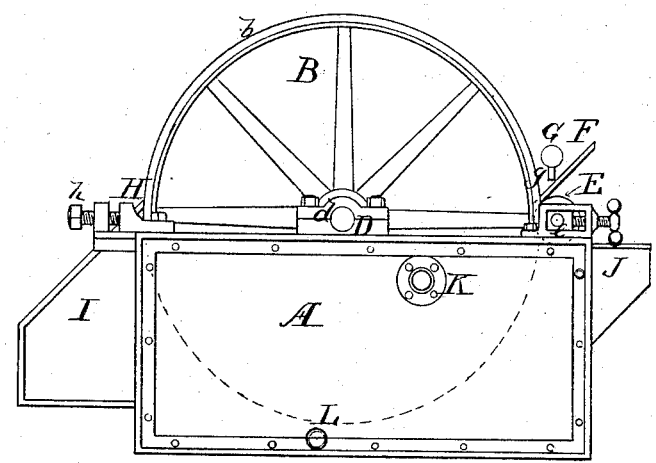

In the drawings, Figure 1 is a top or plan view, and Fig. 2 is an end elevation.

A is a tank, made preferably of iron and of suitable dimensions, in which is contained a refrigerating material or element.

B is a cylinder, made preferably of iron, is provided with spokes and a central hub, and is supported on a shaft, C, having bearings D in boxes *d*, fixed on the top edges of the said tank A. The ends of the cylinder have narrow rims or annular flanges *b b*, for the purpose of retaining the paraffine-oil upon the surface and prevent its running off at the ends.

E is a roller having a pliable or flexible surface, whose journals are set in adjustable bearings *e e* on the upper corners of the aforesaid tank A. The surface of said roller is in contact with the cylinder B, and its object and purpose is to wipe or remove the brine or refrigerant material from the surface of the cylinder. Above said roller E is placed an inclined shelf, F, whose lower edge is in contact with the surface of the cylinder, and is intended to lead the oil onto the cylinder. Over said shelf F is located a pipe, G, whose under side has a row of perforations or small nozzles, *g*. Said pipe is to conduct the oil onto the shelf, bringing it from a supply tank or vessel, which may be located in convenient position therewith. On the opposite side of the cylinder is located an adjustable scraper, H, for removing the chilled paraffine, consisting of a blade having adjusting-screws *h h*, located at each end for regulating its tactile relation with the face of the cylinder. On this side of the tank is located a box, I, for catching the chilled oil as it falls from the scraper. On the opposite side of the tank A is attached a chute, J, having a lid, intended for use in placing ice into the tank. The tank is also provided with an inlet-pipe, K, for admitting the brine or fluid, also an outlet-pipe, L, for drawing off the same.

M is a pulley on the shaft C for giving a rotary motion to the cylinder by a belt connecting the same with any suitable power source.

Instead of the roller E, a flexible wiper arranged to scrape or remove the brine from the cylinder may be substituted therefor; but a roller is preferable.

Having described my invention, I claim—

The combination, with the tank A and cylinder B, the former containing a refrigerating material and the latter arranged to rotate therein, of the flexible roller or wiper E, adjustably arranged therewith, an inclined shelf, F, and perforated pipe G, for conducting the oil to the cylinder, and the adjustable scraper H, for removing the paraffine from the cylinder, substantially as specified.

JOHN TEAGLE.

Witnesses:
GEO. W. TIBBITTS,
E. W. LAIRD.